United States Patent [19]

Ritchie et al.

[11] 4,453,199

[45] Jun. 5, 1984

[54] LOW COST THIN FILM CAPACITOR

[75] Inventors: Kim Ritchie, Myrtle Beach, S.C.; Jed V. Keller, Phoenix, Ariz.

[73] Assignee: AVX Corporation, Great Neck, N.Y.

[21] Appl. No.: 505,177

[22] Filed: Jun. 17, 1983

[51] Int. Cl.³ .................. H01G 1/14; H01G 13/00; B05D 5/12
[52] U.S. Cl. .................. 361/306; 29/25.42; 427/79
[58] Field of Search .................. 29/25.42; 357/51; 427/79, 96; 361/303, 305, 306, 309, 311

[56] References Cited

U.S. PATENT DOCUMENTS

| | | | |
|---|---|---|---|
| 2,759,854 | 8/1956 | Kilby | 427/79 |
| 3,457,614 | 7/1969 | Tibol | 29/25.42 |
| 3,469,294 | 9/1969 | Hayashi et al. | 29/25.42 |
| 3,591,905 | 7/1971 | Elderbaum | 29/25.42 |
| 3,669,733 | 6/1972 | Allington | 427/79 X |
| 3,679,942 | 7/1972 | Daly | 29/25.42 X |
| 3,778,689 | 12/1973 | Bodway | 29/25.42 X |
| 3,809,973 | 5/1974 | Hurley | 361/305 |
| 4,410,867 | 10/1983 | Arcidiacono et al. | 361/306 X |

FOREIGN PATENT DOCUMENTS 54-18363  7/1979  Japan ................. 427/79

Primary Examiner—Donald A. Griffin
Attorney, Agent, or Firm—Arthur B. Colvin

[57] ABSTRACT

The present invention relates to a low cost method of fabricating capacitors within tight tolerance ranges. The method involves forming, by vapor deposition or the like, discrete electrode areas on an insulating substrate, and depositing a dielectric layer over the substrate and the areas between the electrodes. A further series of electrode are formed over the dielectric in partial registry with the first mentioned electrodes, and the substrate is thereafter diced to expose opposed edge portions of the resultant capacitors. The capacitors are terminated preferably by a sputtering technique, the sputtered material being insulated from contact with the edge portions of non-exposed electrodes by the deposited dielectric.

9 Claims, 13 Drawing Figures

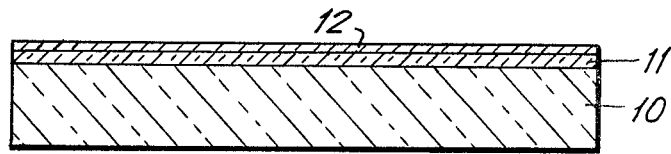
FIG. 1
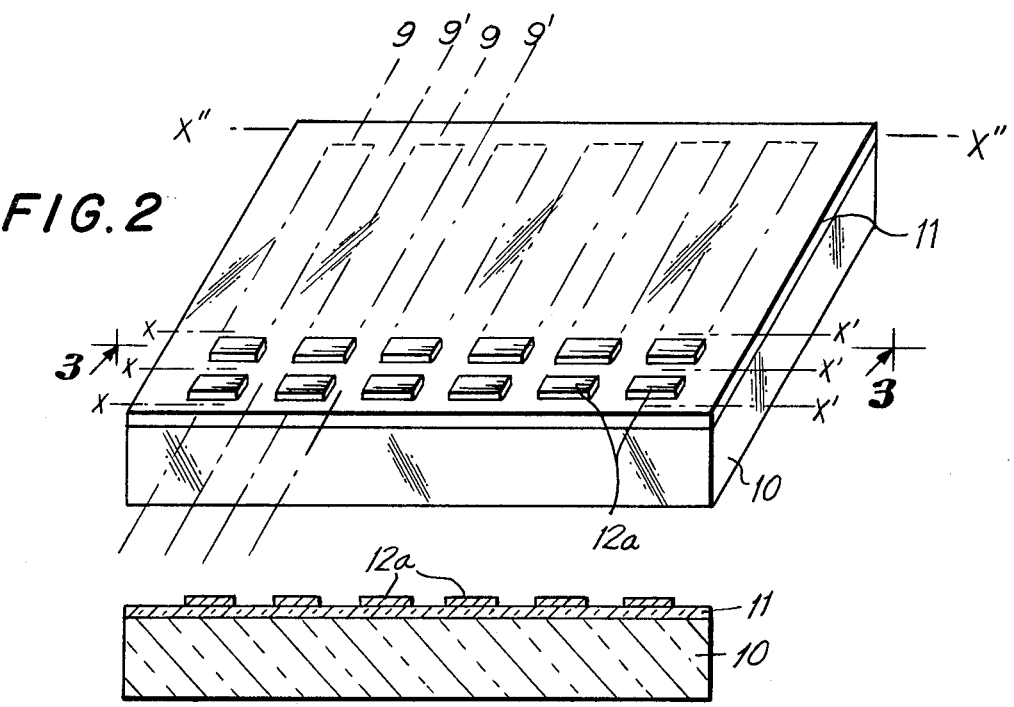
FIG. 2
FIG. 3
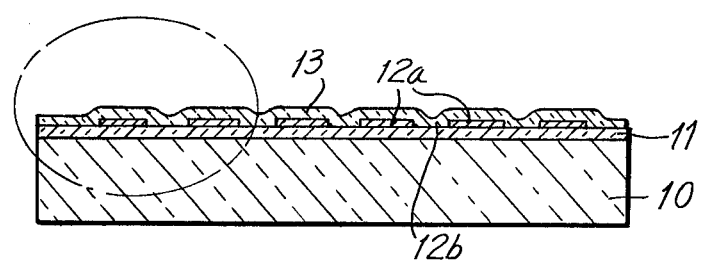
FIG. 4

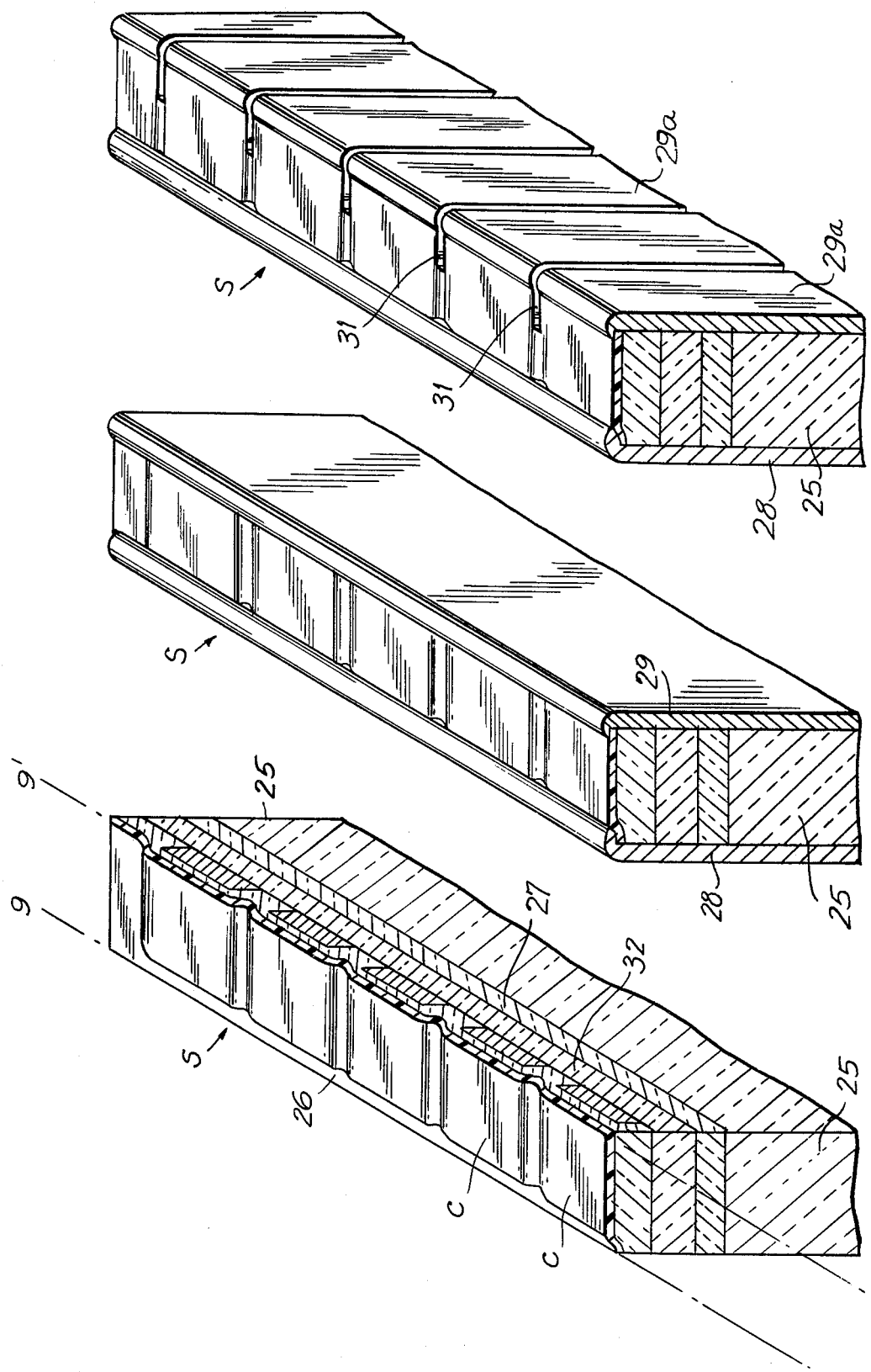

LOW COST THIN FILM CAPACITOR

BACKGROUND OF THE INVENTION

1. Field of the Invention

The present invention is in the field of capacitor manufacture and relates more particularly to a method of manufacturing capacitors comprised of alternate layers of conductive metal electrodes and an interposed layer or layers of dielectric such as silicon dioxide.

2. The Prior Art

Conventional monolithic ceramic capacitors, and particularly capacitors having values within small tolerance ranges are extremely expensive to manufacure. The expense inheres in the manufacturing procedures and materials which have heretofore been required to be employed.

In the typical manufacture of a ceramic monolithic capacitor there is first formed a suspension of ceramic particles in an organic binder which enables the green ceramic materials to be extruded into thin pliant layers. In a succeeding step the layers are imprinted with electrode material as by silk screening procedures with a conductive ink having included metallic particles. The selected metal must be capable of withstanding the high heats of firing of the green ceramic without vaporization, thus mandating the use of platinum, paladium or like extremely costly noble metals.

Suitably imprinted layers of the green ceramic are stacked in such manner that the patterns of imprinted electrode material on alternate layers are disposed substantially in registry, but with edge portions of the electrodes on one layer slightly offset from the edge portions of the electrodes on the alternate layer. The process is repeated until a suitable stack of layers is formed, following which the stack is severed along cutting lines to form individual chips whereby there is exposed at opposite severance lines electrodes of one polarity only.

The resultant articles are thereafter heat treated first to vaporize the organic binder material and thereafter subjected to higher temperatures which function to fire the ceramic components and form a monolithic capacitor.

Thereafter the fired capacitors are terminated by applying a silver containing paste to the exposed electrode portions which treated edge portions are thereafter heated to effect a conductive relationship between each of the individual electrodes and the associated terminations.

The difficulties and high costs inherent in the outlined manufacturing steps are well known to those skilled in the art. These difficulties are multiplied when it is desired to produce capacitors to close tolerances. More particularly, it will be apparent that the capacitive value of each individual chip is dependent not only on the composition and thickness of the dielectric and the area of imprintation of the silk screened electrode material, but also on the precision with which adjacent layers bearing the imprintations are oriented one to the other.

In addition, careful controls must be exercised in respect of the volitilization and firing steps to produce a capacitor having values within a predictable tolerance range.

For close tolerance applications, it is conventional to manufacture capacitors in such manner that the capacitance exceeds that which is desired. After the capacitor is formed the overlap area of the electrodes is erroded or worn-away as by a sand blasting jet directed normal to the broad surface of the capacitor, so as to reduce the capacitance to the desired value. The net result of the manufacturing complexities outlined above may often raise the cost of a close tolerance capacitor to a multiple of a hundred or more times the cost of a capacitor of equal electrical properties, but not requiring close tolerance controls.

Numerous procedures have been suggested as a means of simplifying the manufacture of close tolerance ceramic or metal oxide capacitors of the so-called thin film type. By way of example U.S. Pat. No. 3,149,393 discloses forming a capacitor by depositing a silicon film on a substrate, oxidizing the silicon, applying metal to the oxidized silicon and thereafter forming a multilayered capacitor from the noted base material.

U.S. Pat. No. 3,679,942 suggests the formation of a thin film capacitor by depositing over a first conductive material a layer of silicon dioxide which is thereafter densified under wet gaseous atmosphere following which the oxide layer is dried, and a second electrode deposited. No means of terminating the resultant capacitor is suggested.

U.S. Pat. No. 3,469,294 pertains to a method of forming capacitors which includes electrolytically depositing a dielectric oxide layer on a surface of anodizable aluminum strip, forming an insulating grid over a pattern of interconnecting areas on the surface of the oxide layer, electrolytically depositing semiconductor oxides into the grid openings to form electrodes and thereafter severing the thus formed structure along the grid lines. Connections are effected to the resultant capacitors for purposes of termination, by forming silver deposits on the respective electrodes and connecting wires to the silver deposits.

U.S. Pat. No. 3,457,614 teaches forming a capacitor by depositing a anodizable metal on an insulating substrate, such as glass, anodizing the surface of the deposited metal to provide a dielectric film, depositing counterelectrodes, depositing copper lands on the ends of the counterelectrodes and thereafter dicing or subdividing the substrate along predetermined zonal lines to form individual capacitor units.

U.S. Pat. No. 3,591,905 is cited in view of its showing of a means of subdividing an enlarged capacitor forming sheet into a multiplicity of discrete capacitor units.

U.S. Pat. No. 3,809,973 discloses a termination method which involves placing a silver and thereafter a gold covering over the exposed electrode edges at the margins of the ceramic capacitor.

While various of the above noted references suggest means for the formation of thin film capacitors, none of the noted references enables the economical fabrication of compact thin film capacitors capable of being formed within precise tolerances ranges and capable of being terminated without elaborate soldering techniques and without the use of relatively high concentrations of noble metals.

SUMMARY OF THE INVENTION

With the foregoing background in mind, the present invention may be summarized as directed to the provision of a low cost, compact thin film capacitor which is nonetheless capable of being produced within tolerance ranges heretofore associated only with custom fabricated and individually calibrated capacitor units.

In accordance with the invention, there is provided a substrate of non-conductive material, by way of example glass. An electrode material of a non-nobel metal such as aluminum or nickel is deposited onto the substrate as by vapor deposition, evaporation or sputtering.. Thereafter discrete areas of the continuous coating of electrode material are removed, preferably by the use of a photoresist coating and subsequent etching techniques known per se.. A thin film of dielectric, for instance silicon dioxide, is deposited over the substrate to cover the metal electrode components and the separations resulting from the photoetch process. A second electrode layer is deposited and etched, the etching being effected in a manner to leave discrete metallic areas which are slightly out of registry with the metallic areas formed as a result of the first etching step. Individual capacitors may be formed by sawing or otherwise subdividing the substrate along division lines which conform to portions of the electrode layers which are out of registry with all portions of the layers of opposite polarity, that is to say each division line intersects only one of the two series of electrodes and then further subdividing the substrate along division lines at right angles to the first division lines and extending solely through the layers of dielectric material between adjacent layers of electrode material.

The resulting capacitor blanks are terminated preferably by sputtering a coating over the opposite sides defined by the cuts which separate the substrate into a series of blanks and at which edges of the electrodes are exposed.

In accordance with a preferred embodiment, a multilayer capacitor chip is formed by sequentially depositing series of dielectric and metal coatings, the metal coating located at discrete precisely positioned electrode areas, it being understood that all of the areas defining a given electrode are oriented so as to be out of registry at least at an edge portion thereof, with an opposite edge portion of the area defining the other electrode. It will thus be appreciated that when the substrate is severed, all electrode areas in one layer will be exposed at one edge and subject to termination as by sputtering and the same is true of all electrode areas in an adjacent area.

Before severing of the substrate into individual capacitor units, a passivating or insulating coating may be applied.

A significant feature of the invention resides in the fact that the dielectric coating which is deposited over the metal electrode formations, coats not only the upper surfaces of the electrodes, but also coats the electrode edge surfaces. As a result, when the completed matrix is sawn or otherwise divided into discrete substantially rectangular blanks along lines exposing one set of electrode edges for termination, it is assured that the edge portions of the electrodes of opposite polarity which lie in spaced relation to the exposed edges are securely covered with insulating material. In this way, it is possible to terminate the capacitor using sputtering techniques without concern that the sputtered material will penetrate between spaced dielectric layers and engage the edges of the recessed electrodes with resultant shorting of the capacitor.

It will be further appreciated that where a multiplicity of electrode layers are embodied in the capacitor, the end insulating functions of the dielectric assumes increasing importance.

It is accordingly an object of the invention to provide a low cost, high tolerance, monolithic, thin film capacitor as well as a method for forming the same. It is a further object of the invention to provide a method of manufacturing a capacitor of the type described characterized in that termination by sputtering may be effected with little or no liklihood that the sputtered metal material will bridge the gap between electrodes of the various groups.

In order to attain these objects and such further objects as may appear herein or be hereinafter pointed out reference is made to the accompanying drawings in which:

FIG. 1 is a transverse sectional view illustrating a treated substrate in the course of manufacture of the capacitors according to the invention;

FIG. 2 is a perspective view illustrating a stage of manufacture with the first electrode deposited on the substrate;

FIG. 3 is a transverse sectional view taken along line 3—3 of FIG. 2;

FIG. 4 is a view similar to FIG. 3 showing a further step in the course of manufacture;

FIG. 11 is a perspective view of an array of capacitors made in accordance with the invention;

FIG. 12 is a view similar to FIG. 11 with the side edges of the capacitor array terminated and;

FIG. 13 is a view similar to FIG. 11 at a final step in the manufacture.

Figure 5:
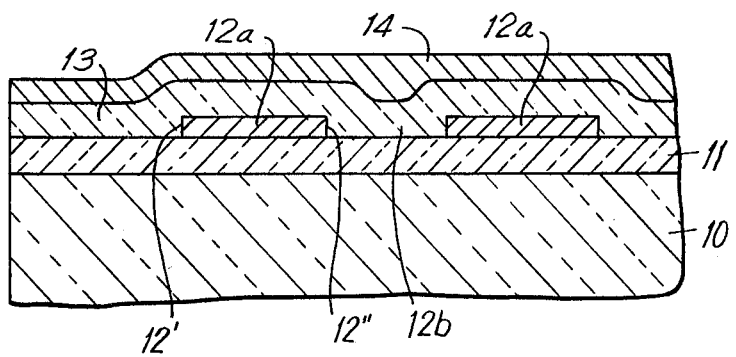
FIGS. 5 through 8 are enlarged views of a segment of the treated substrate during progressively further steps in the manufacture thereof.

Referring now to the drawings there is shown in FIG. 1 a substrate 10, preferably a glass plate of a thickness of approximately 20 to 30 mils. In accordance with the invention there is optionally coated over the substrate 10 a layer of phosphorus doped silicon dioxide precoat 11 incorporating approximately 3% phosphorus. The precoat is applied at approximately 460 degrees C., until a layer of about 1.5 micrometers is built up. The resultant substrate then has a conductive material 12 preferably aluminum or nickel deposited thereon to form a layer having a thickness of approximately 0.5 micrometers. The resultant electrode layer 12 is patterned with a standard photoresist cover coat and is photoetched to define a series of discrete metal islands or electrodes which are preferably square or rectangular in plan, the islands being shown at 12a. By way of example the patterned metal islands 12a may have a dimension of 2.017 mm by 1.055 mm.

The thus treated substrate has applied to the upwardly directed surface thereof a layer of dielectric material illustratively silicon dioxide, the deposition being effected at about 460 degrees C to an overall thickness of approximately 11,550 Angstroms. The dielectric layer is shown in FIG. 4 at 13 and possesses a dielectric constant of 3.97.

As will be apparent from an inspection of FIGS. 4 and 5, the dielectric material 13 covers not only the electrode forming portions 12a but also the area 12b between adjacent portions 12a with the result that the edge portions 12' and 12" of the electrode forming portions 12a are also covered by the dielectric material 13. It will be evident that the thickness of the various layers of material have been exaggerated for purposes of clarity.

Figure 6:
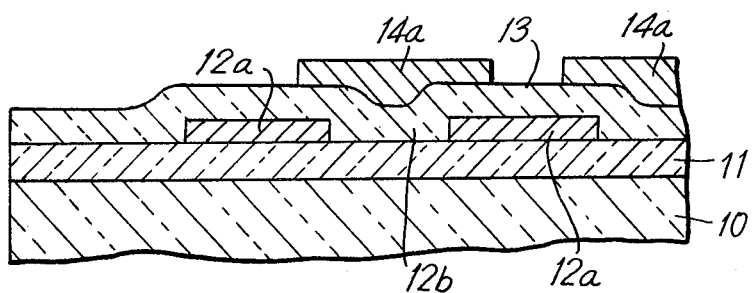

FIG. 5 comprises a fragmentary section of the substrate 10 namely the section within the circle of FIG. 4. The next step in the manufacturing procedure involves depositing a further one micrometer thickness of aluminum or nickel by a procedure to form a thin film layer, the layer being identified in FIG. 5 by the reference numeral 14. The layer 14 is treated by a standard photoresist process to define a pattern of rectangles 1.950 mm. by 0.908 mm. The thus formed rectangle which defines a second electrode of the capacitor is identified in FIG. 6 by the reference numeral 14a. As will be apparent from an inspection of FIG. 6, the electrode 14a partially overlaps adjacent electrodes 12a. and in addition overlaps the gap or space 12b defined between the adjacent electrodes 12a.

Figure 7:
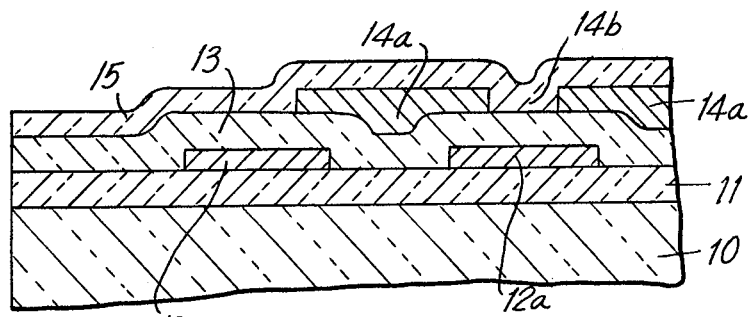

Thereupon another thin film layer 15 of dielectric material illustratively silicon dioxide, is appled to the upwardly directed surfaces of the second electrodes 14a and the spaces 14b therebetween as shown in FIG. 7.

The next step is to coat and cure an organic conformed coating material 16 for example polymeric on the layer of dielectric material 15.

Figure 8:
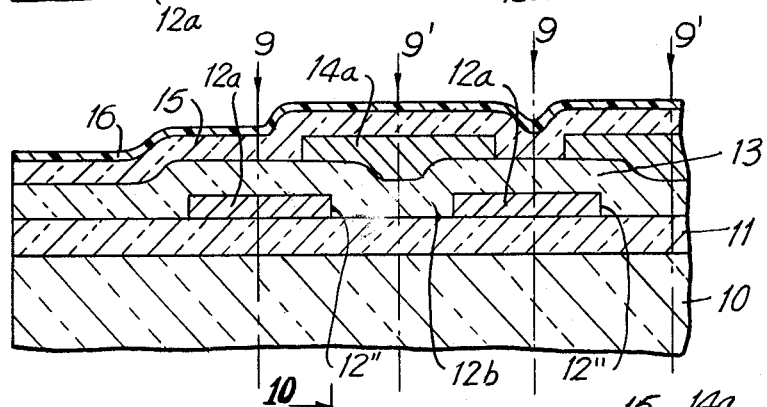
Figure 9:
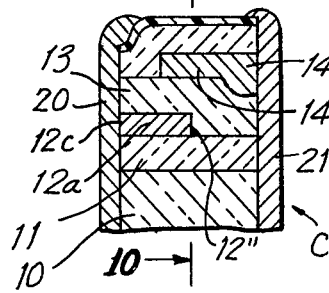
FIG. 9 is a sectional view taken along lines 9-9' of FIG. 8 showing the capacitor chip according to the invention.
Figure 10:
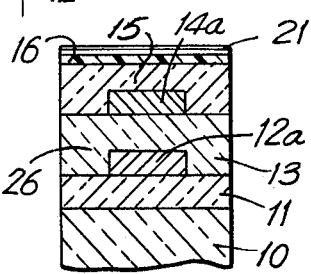
FIG. 10 is a sectional view taken along line 10—10 of FIG. 9.

The matrix thus formed is thereupon sliced into individual units by cutting or dicing along the lines 9-9', as shown in FIGS. 2 and 8 and X-X' as shown in FIG. 2, resulting in the formation of a rectangular capacitor blank or chip such as is shown in FIGS. 9 and 10. It will be observed that the cutting line 9 is located so as to extend through the electrode 12a and expose the marginal edge 12c(FIG. 9) of electrode 12a. The cutting line 9' is located so as to extend through the electrode 14a and also to pass through the space 12b lying outwardly of the opposite end 12" of the electrode 12a and expose the marginal edge 14c of electrode 14a.

The resultant capacitor member C, as is illustrated in FIG. 9 may be terminated by sputtering the side edge portions including the electrode edges 12c and 14c, with one or more layers 20,21 of conductive materials. Illustratively, the termination portions 20 and 21 may be defined by an initial layer of chromium, a covering layer of nickel and a final layer of silver, to render the termination readily solderable. By way of example, the thickness of the chrome coating may be in the order of 400 Angstrom, the nickel approximately 0.5 micrometer and the silver 0.15 micrometer.

In the described embodiment the actual active overlap area of the electrode surfaces is approximately 0.908 mm. by 1.808 mm., yielding a capacitance of 42.5 picrofarads. For purposes of convenience in handling, the overall size of the chip in plan is preferably cut to the standard of 80 mils by 50 mils.

The resultant chip has been found to be humidity insensative, notwithstanding the fact that the sole incapsulating coating or coatings are those which have been applied over the upper surface, and the sputtered terminations 20 and 21.

As will be apparent from an inspection of FIG. 9, the cut formed on the line 9 would, if the dielectric layer 13 were purely planar in configuration, provide an opening or space adjacent the side edge 12" of the electrode 12a. Under such circumstances, if a sputtered termination was applied in a direction toward the side edge 12" of the electrode 12a, it is altogether possible that elements of the sputtered termination material would bridge the gap between the electrode 14a and the electrode 12a, since increments of the deposited termination metal would impinge against the side edge 12" of electrode 12a. However, in accordance with the method of the present invention the dielectric coating 13 does not form a merely planar layer but rather coats not only the top surface of electrode 12a but also the edge surface 12" thereof. Due to the protection afforded by such dielectric coating, termination by sputtering is rendered possible.

As will be readily apparent to those skilled in the art, the capacitance and working voltage characteristics of a capacitor formed in accordance with the method of the present invention may be readily varied by modifying the overlap area of the electrodes, and the thickness of the dielectric layer.

For example, a capacitor of higher value, but lesser working voltage may be fabricated utilizing the identical steps set forth hereinabove with the exception that the deposited silicon dioxide layer is applied to a thickness of approximately 5,750 Angstrom. The resultant chip has a capacitance of approximately 85 picofarads.

Additionally, it is feasible to increase the capacitance by repeated applications of layers of dielectric and electrode. It is understood that in accordance with standard practice one of the side edges of each of the electrodes of a first polarity will be in registry, and one of the side edges of each of the electrodes of a second polarity will be in registry, and the other side edges of the electrodes of each polarity will be laterally offset from the side edge portions in registry of the electrodes of opposite polarity. Thus, when the matrix is diced, the cut lines at opposite sides of the individual capacitor units will each expose a set of electrode edge portions, each set being of common polarity while the other edge portions of each set of electrodes of common polarity will be laterally offset or recessed from the cut lines defining the electrodes of opposite polarity and hence protected against contact with the sputtered terminations by the intervening dielectric material.

The embodiment shown in FIGS. 1 to 10 deals with the formation of individual chips or capaciots.

It is possible according to the invention to form an array of capacitor chips as shown in FIG. 13.

To form such array, referring to FIG. 2, instead of cutting the entire matrix along lines 9-9' and X-X' to form individual chips, the array after it has been formed as shown in FIG. 8 is sliced along the lines X" X' to expose the two ends 25 of a line of capacitors C. As noted, both ends 25 are completely sealed and only expose non-conducting material.

Thereupon the matrix is sliced on the lines 9-9' to define a strip or array S of capacitors, each side edge 26, 27 exposing the side edges of a set of electrodes, each set being of the same polarity.

Thereupon the side edges 26, 27 are terminated as by sputtering, so that a conductive layer 28, 29 extends the length of the array S as shown in FIG. 12.

To complete the array, slits 31 are made completely through the conductive termination layer 29 into the non-conductive material 32 between each of the capacitor chips C.

As a result, an array S of capacitors or chips C made according to the invention will be formed having the exposed edges of the electrodes on one side 26 having a common termination 28 and the exposed edges of the electrodes of each chip C on the other side 27 individually terminated by the termination material 29a.

Thus, each array will have a common termination 28 and individual terminations 29a, so that a set of individual capacitors C may be connected in a number of circuits with a single common termination.

It will be appreciated that where multilayer capacitors are formed by the described method, i.e. where the capacitor is comprised of more than two electrode layers, that the significance of the side protecting or insulating function of the dielectric materials becomes of progressively greater importance. This is true since the vertical spacing between adjacent electrodes at the edge portions has a tendency of increasing progressively with the number of additional electrode layers.

The above described method of forming capacitors provides a means of economically fabricating capacitors having extremely high capacitance per volume and subject to being fabricated to very close tolerance without the necessity of subsequent adjustments. The capacitors may be directly soldered into circuits without the necessity of utilizing wire terminals. The capacitors are humidity insensitive, durable, of uniformly high quality, and the reject rate is extremely low.

As will be apparent to those skilled in the art and familiarized with the instant disclosure, numerous details in the fabricating procedure may be varied without departing from the spirit of the invention. Such details include the formulation of the electrode, dielectric, and passivating coatings, and also the thickness of such components. Additionally, the formulation and thickness of the sputtered terminations may be modified to suit desired end conditions.

Accordingly, the invention is to be broadly construed with the scope of the appended claims.

Having thus described the invention and illustrated its use, what is claimed as new and is desired to be secured by Letters Patent is:

1. The method of manufacturing a capacitor which comprises the steps of:
   a. Providing an insulating substrate;
   b. Forming by deposition a thin film conductive layer supported by said substrate;
   c. Removing increments of said deposited conductive layer to define a first plurality of discrete electrically isolated conductive areas arranged in rows and columns on said substrate.
   d. Forming by deposition a continuous layer of dielectric material over said metallic areas and the areas previously occupied by said removed increments thus to cover the side edges of said isolated areas;
   e. Forming by deposition over said deposited dielectric layer a further conductive layer;
   f. Removing increments of said further conductive layer to define a second plurality of discrete electrically isolated conductive areas in partial registry with the areas of said first plurality, each of said first and second plurality of conductive areas having at least one edge portion out of registry with an area of the other said plurality;
   g. Forming by deposition a continuous layer of dielectric material over said second plurality of discrete electrically isolated conductive areas and the areas previously occupied by said removed increments, thus to cover the side edges of said second isolated areas;
   h. Severing said substrate and layers which define a matrix along severance lines normal to said substrate, each said severance line at least being positioned to intersect the non-registering portions of said metallic areas in adjacent layers thereby to expose at said severance lines, edge portions of metallic areas in alternate layers;
   i. Thereafter depositing a conductive termination layer over the exposed edge portions of said metallic area formed by said severance lines, thus electrically to connect the exposed edge portions of said areas at spaced positions and form terminations of said capacitors.

2. The method in accordance with claim 1 and including repeating sequentially steps b, c, d, e, f and g in advance of performing steps h and i, to thereby provide a capacitor wherein each electrode is comprised of a plurality of layers of conductive material connected in parallel.

3. The method in accordance with claim 1 and including the step of sputtering a plurality of conductive layers over each of said exposed edge portions of said conductive areas to define said terminations.

4. The method in accordance with claim 1 and including the step of applying an outer insulating layer over the uppermost surface of the last applied said dielectric layer in advance of severing said matrix.

5. The method in accordance with claim 1 in which said severence lines extend at right angles to each other to define rectangles, one of said severance lines intersecting the non-registering portions of said metallic areas and the other severance line at right angles to the first severance line intersecting only the non-conductive layers between adjacent metallic areas.

6. The method in accordance with claim 1 in which the severance lines positioned to intersect the non-registering portions of said metallic areas in adjacent layers forms a column of partially completed capacitors, each side of said column having an exposed edge of the metallic area, the conductive layer that is deposited on the exposed edges of the metallic areas to define a termination, covers all of the exposed edges on both sides of the column of capacitors, and a slit is formed through the conductive termination layer on one side of the column and through the non-conductive material between each row of conductive areas to electrically isolate the individual capacitors.

7. An electric capacitor comprising an insulating substrate, a deposited layer of a thin film of conductive material defining a substantially rectangular electrode on said substrate, a vapor deposited layer of dielectric material on said electrode covering the top surface thereof and three edges thereof and exposing one edge, a further deposited conductive thin film layer on said dielectric layer, defining a second substantially rectangular electrode in partial registry with said first electrode and having one edge out of registry with the exposed edge of the first electrode, and having the opposite edge exposed, a deposited layer of dielectric material on said second electrode covering the top surface thereof and three edges thereof leaving said opposite edge exposed and a deposited conductive thin film layer on each side of the capacitors in electrical connection with the associated exposed edges of the electrodes.

8. The capacitor set forth in claim 7 in which the electrodes are of non-nobel metal.

9. A capacitor array comprising an elongated insulating substrate, defining a strip, a plurality of spaced deposited areas of conductive material on said strip each area defining an electrode, a deposited layer of dielectric material on said plurality of electrodes covering the top surfaces thereof and three edges thereof and exposing one edge of each electrode at one side of the strip, a further plurality of spaced deposited areas of conductive material on said layer of dielectric material, each said further plurality of electrodes being in partial registry with an electrode of said first plurality of electrodes and having one edge out of registry with the exposed edge of an electrode of said first plurality and the opposite edge exposed on the other side of said strip, a second deposited layer of dielectric material on said further plurality of electrodes covering the top surfaces thereof and three edges thereof and exposing one edge of each of said further electrodes, a deposited conductive layer on one side of said strip electrically connecting the exposed edges of each of the first plurality of electrodes, a plurality of slits extending through the other side of said strip and through the dielectric material between the electrodes extending the length of the strip and a deposited conductive layer on the edges of the electrodes exposed on said other side of said strip.

* * * * *